United States Patent [19]
Sather
[11] 3,829,672
[45] Aug. 13, 1974

[54] SERIAL BINARY SQUARE ROOT APPARATUS

[75] Inventor: Delaine C. Sather, Cedar Rapids, Iowa
[73] Assignee: Collins Radio Company, Dallas, Tex.

[22] Filed: June 6, 1973
[21] Appl. No.: 367,615

[52] U.S. Cl. .................... 235/158
[51] Int. Cl. .................... G06f 7/38
[58] Field of Search .................... 235/158

[56] References Cited

UNITED STATES PATENTS 3,610,904 10/1971 Kumagai .................... 235/158

OTHER PUBLICATIONS

D. Cowgill, "Logic Equations For a Built-In Sq. Rt. Method" IEEE Trans. on "Electronic Computers" April 1964, pp. 156–157.

*Primary Examiner*—Malcolm A. Morrison
*Assistant Examiner*—David H. Malzahn

[57] ABSTRACT

Circuitry for examining the individual bits of a radicand of which the square root is to be determined and the resulting remainder produced during the square rooting process. The circuit stores the bits obtained during each step of the operation and uses the stored information in succeeding steps until a number of steps have occurred equal to the number of bits in the original radicand at which time the square rooting process is completed. The circuit is operational only for positive radicand.

6 Claims, 3 Drawing Figures

| WORD TIME → | $N_0$ | $N_1$ | $N_2$ | $N_3$ | $N_4$ | $N_5$ | $N_6$ | $N_7$ | $N_0$ |
|---|---|---|---|---|---|---|---|---|---|
| SB | 00000001 | 00000001 | 00000001 | 00000001 | 00000001 | 00000001 | 00000001 | 00000001 | 00000001 |
| (1) | 10000000 | 10000000 | 10000000 | 10000000 | 10000000 | 10000000 | 10000000 | 10000000 | 10000000 |
| IN | 10000001 | 00000010 | 00000100 | 00001000 | 00010000 | 00100000 | 01000000 | 00000000 | 10000001 |
| OUT | 00000100 | 00001000 | 00010000 | 00100000 | 01000000 | 10000001 | 00000010 | 00000000 | 00000100 |
| $M=1/2^{(N+2)}$ | 00000100 | 00001000 | 00010000 | 00100000 | 01000000 | 10000000 | 00000000 | 00000000 | 00000100 |
| $1/2^N$ | 00000001 | 00000010 | 00000100 | 00001000 | 00010000 | 00100000 | 01000000 | 10000000 | 00000001 |
| J | 00000000 | 00000010 | 00000010 | 00001010 | 00011010 | 00011010 | 01011010 | 11011010 | 00000000 |
| M+J | 00000100 | 00001010 | 00010010 | 00101010 | 01011010 | 10011010 | 01011010 | 11011010 | 00000000 |
| I | 10000010 | 01000010 | 00100001 | 00011110 | 00010010 | 00001001 | 01110110 | 00010100 | |
| I−M−J | 10000100 | 01001111 | 00111100 | 00100100 | 01110111 | 11101100 | 00101000 | 10110011 | |
| S | | 11111111 | 11111111 | 11111111 | 11111111 | 11111111 | 11111111 | 11111111 | 11111111 |
| SIGN(I−M−J) | | 11111111 | 00000000 | 11111111 | 11111111 | 00000000 | 11111111 | 11111111 | 00000000 |
| I/2 | | 10000100 | 01000010 | 00111100 | 00100100 | 00010010 | 11101100 | 00101000 | 00010100 |
| I/2′ | 0 | 10000100 | 01000010 | 00111100 | 00100100 | 00010010 | 11101100 | 00101000 | 0001010 |
| $\sqrt{I_0}$ | | | | | | | | | 11011010 |

FIG. 2

| | | | |
|---|---|---|---|
| N=0 | $I = I_0 =$ input<br>$J = 0$ | | |
| N=1 | IF $I_0 \geq 1/4$<br>$I_1 = 2(I_0 - 1/4)$<br>$J_1 = 1/2$ | OR | IF $I_0 < 1/4$<br>$I_1 = 2I_0$<br>$J_1 = 0$ |
| N=2 | IF $I_1 \geq 1/8 + J_1$<br>$I_2 = 2(I_1 - 1/8 - J_1)$<br>$J_2 = J_1 + 1/4$ | OR | IF $I_1 < 1/8 + J_1$<br>$I_2 = 2I_1$<br>$J_2 = J_1$ |
| N=3 | IF $I_2 \geq 1/16 + J_2$<br>$I_3 = 2(I_2 - 1/16 - J_2)$<br>$J_3 = J_2 + 1/8$ | OR | IF $I_2 < 1/16 + J_2$<br>$I_3 = 2I_2$<br>$J_3 = J_2$ |
| N=4 | IF $I_3 \geq 1/32 + J_3$<br>$I_4 = 2(I_3 - 1/32 - J_3)$<br>$J_4 = J_3 + 1/16$ | OR | IF $I_3 < 1/32 + J_3$<br>$I_4 = 2I_3$<br>$J_4 = J_3$ |
| N=5 | IF $I_4 \geq 1/64 + J_4$<br>$I_5 = 2(I_4 - 1/64 - J_4)$<br>$J_5 = J_4 + 1/32$ | OR | IF $I_4 < 1/64 + J_4$<br>$I_5 = 2I_4$<br>$J_5 = J_4$ |
| N=6 | IF $I_5 \geq 1/128 + J_5$<br>$I_6 = 2(I_5 - 1/128 - J_5)$<br>$J_6 = J_5 + 1/64$ | OR | IF $I_5 < 1/128 + J_5$<br>$I_6 = 2I_5$<br>$J_6 = J_5$ |
| N=7 | IF $I_6 \geq J_6$<br>$I_7 = 2(I_6 - J_6)$<br>$J_7 = J_6 + 1/128$ | OR | IF $I_6 < J_6$<br>$I_7 = 2I_6$<br>$J_7 = J_6$ |
| N=0 | $\sqrt{I_0} = J_7 =$ output<br>$I_0 =$ input<br>$J_0 = 0$ | | |

$$J_N = J_{(N-1)} + (1/2^N)S$$
$$I_{(N+1)} = 2(I_N - 1/2^{(N+2)} - J_N)$$
$$\text{IF } I_N \geq 1/2^{(N+2)} + J_N$$

OR $$J_N = J_{(N-1)}$$
$$I_{(N+1)} = 2I_N$$
$$\text{IF } I_N < 1/2^{(N+2)} + J_N$$

FIG. 3

SERIAL BINARY SQUARE ROOT APPARATUS

The present invention is concerned generally with electronics and more specifically with an electronic circuit for providing an output word indicative of the square root of an input serial binary format radicand.

Although there are various types of circuits for obtaining the square root of a number, it is believed that the present circuit, based upon the use of basic components described in other applications of mine such as an application entitled "Integration and Filtration Circuit Apparatus" Ser. No. 225,443 filed Feb. 11, 1972, now U.S. Pat. No. 3,757,261 is unique. I specifically wish to incorporate by reference the teachings in this previous application as to the construction and use of components therein illustrated. These circuit components have been assembled in various formats in the referenced U.S. Pat. application Nos. 3,755,660; 3,761,699; and in this application; and here illustrate the concept of using these circuit components to obtain a square root serial binary format word from a similarly constructed radicand.

It is, therefore, an object of the present invention to provide a simplified and improved square root circuit.

Other objects and advantages of the present invention will be apparent from a reading of the specification and appended claims in conjunction with the drawings wherein:

FIG. 2 is a table indicating the binary words appearing at various points in the circuit of FIG. 1 for each of the words of a frame of operation; and FIG. 3 is a chart illustrating the decisions performed by a gating circuit portion of FIG. 1 in determining the nature of the remainder to be stored for the next step of operation.

DETAILED DESCRIPTION OF FIG. 1

Figure 1:
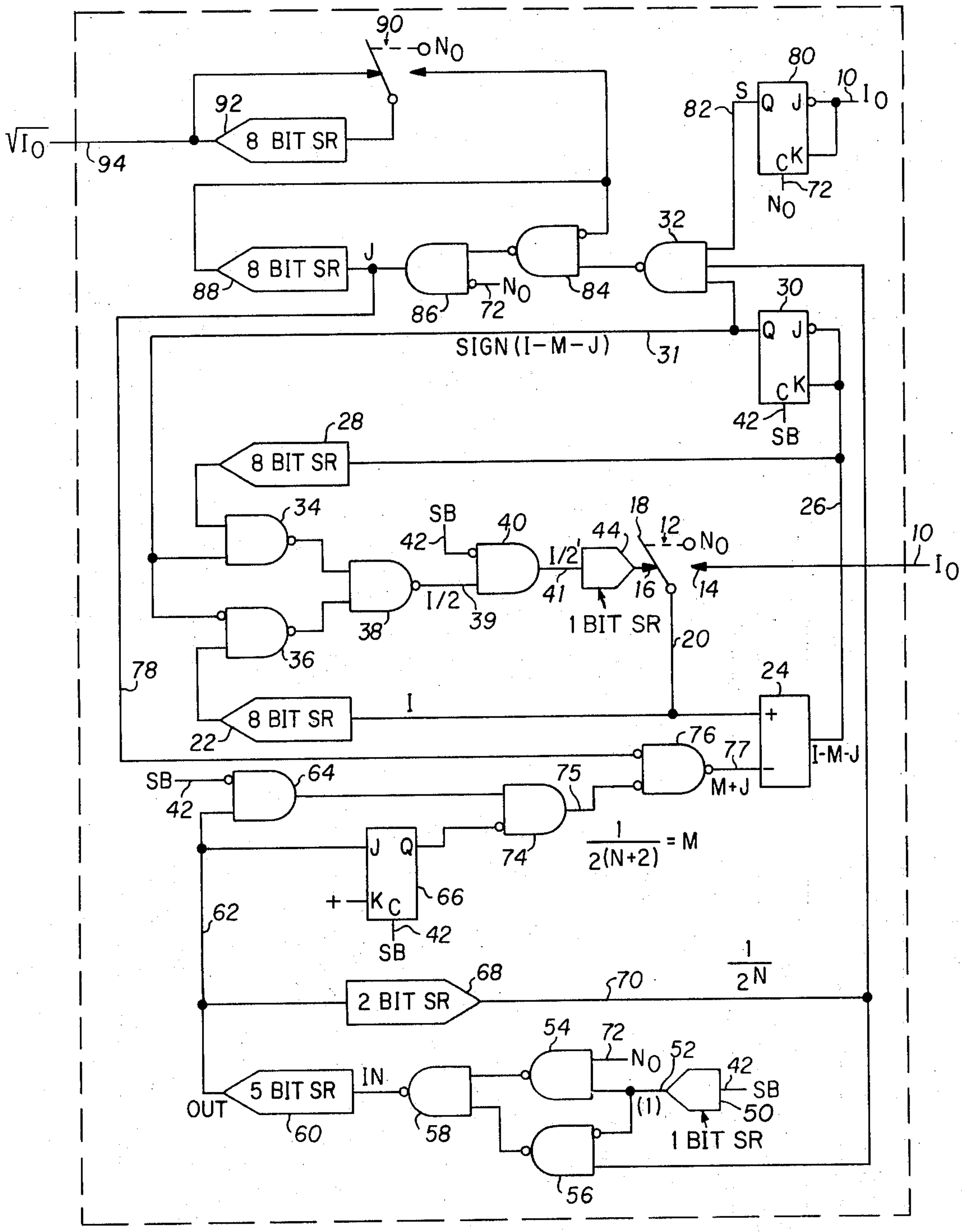
FIG. 1 is a schematic diagram of the overall square root circuit.

An input 10 is used to supply the radicand $I_o$ to a switch generally designated as 12. Switch 12 has contacts or inputs 14 and 16 with a movable contact 18 connected therebetween and having an output lead 20. Movable contact 18 is moved between contacts 14 and 16 in accordance with an input signal $N_o$ which occurs during the entire time of and only during word time $N_o$ of a frame. The lead 20 is connected to an input of an 8 bit shift register 22 and also to a summing circuit or subtraction circuit 24. An output of subtraction circuit 24 is shown on lead 26 and is supplied to an input of a second 8 bit shift register 28 as well as to a K input of a J-K flip-flop 30. Lead 26 is also inverted and supplied to the J input of J-K flip-flop 30. A Q-output of J-K flip-flop 30 is supplied on a lead 31 to a first input of a NAND gate 32 as well as being supplied to an input of a NAND gate 34 and is inverted and supplied to an input of a NAND gate 36. An output of shift register 28 is supplied to a further input of NAND gate 34 while an output of shift register 22 is supplied to a further input of NAND gate 36. The outputs of NAND gates 34 and 36 are supplied to inputs of a NAND gate 38 which has its output supplied on a lead 39 to an AND gate 40. A sync bit or sign bit lead 42 is inverted and supplied to a second input of AND gate 40. An output of AND gate 40 is supplied on a lead 41 to an input of a 1 bit storage register, delay circuit or shift register 44 and the output thereof is supplied to contact 16. The sync bit 42 is also supplied through a 1 bit shift register or storage means 50 whose output is supplied on a lead 52 to a NAND gate 54 and is also inverted and supplied to an input of a NAND gate 56. Lead 52 is designated in the diagram as (1). The outputs of NAND gates 54 and 56 are supplied to two inputs of a NAND gate 58 whose output is supplied to a 5 bit shift register 60. An output of 5 bit shift register 60 is supplied on a lead 62 to an input of an AND gate 64, a J input of a J-K flip-flop 66 and to an input of a 2 bit shift register designated as 68. An output of shift register 68 is supplied on a lead 70 to a second input of NAND gate 56 and is also supplied to a second input of NAND gate 32. NAND gate 54 has a further input designated as 72 which supplies signals during the entire word time $N_o$ for actuation of NAND gate 54 during this time zone. J-K flip-flop 66 has a K-input connected permanently to a logic 1 or positive lead. The clock input is connected to sync bit 42. Thus, J-K flip-flop 66 will provide a logic 1 at the Q-output thereof upon the simultaneous occurrence of logic 1 on the J input and a logic 1 on the clock input. When a logic 1 appears only on the clock input the Q-output will go to logic 0 and will remain in this condition until the further occurrence of logic 1's on both the J and the clock inputs. The Q-output of J-K flip-flop 66 is inverted and supplied to an AND gate 74. Sync bit 42 is inverted and supplied to a second input of AND gate 64. An output of AND gate 64 is supplied to an input of AND gate 74. An output 75 of AND gate 74 is supplied to an inverted input of a NAND gate 76. The signal on a lead 78 is inverted and supplied as a second input to NAND gate 76. As will be realized by those skilled in the art, a NAND gate having two inverted inputs is operationally identical with an OR gate. An output 77 of NAND gate 76 is connected to a second input of summing means 24. Summing means 24 is operationally constructed to provide an output on lead 26 which is the difference between that supplied on the positive signal lead 20 and that supplied on the lead from NAND gate 76. The input signal 10 is inverted and supplied to a J input of a J-K flip-flop 80 and is also supplied to a K input of flip-flop 80. $N_o$ is supplied on lead 72 to the clock input of J-K flip-flop 80. An output 82 which is also labeled as S from the Q-terminal of flip-flop 80, is supplied to a third input of NAND gate 32. An output of NAND gate 32 is supplied to an input of a NAND gate 84 whose output is supplied to an input of an AND gate 86. $N_o$ input 72 is inverted and also applied to AND gate 86. An output of AND gate 86 is supplied to an input of an 8 bit shift register or storage means 88 and was previously designated as lead 78 and further designated as lead J. An output of shift register or storage means 88 is inverted and supplied to a second input of NAND gate 84 and is also supplied through a switch generally designated as 90 to an input of a further shift register 92 during the time period $N_o$. During the remainder of the time, the switch 90 is in a condition whereby the word continuously circulates through the 8 bit shift register 92 whereby it is connected to an output terminal 94 and will provide the square root result at the output terminal 94.

As will be noted, lead 62 is labeled OUT while lead 70 is labeled $1/2^N$. Lead 77 from NAND gate 76 is the quantity M + J with the lead 75 being M and the lead 78 being J. Lead 26 is I - J - M whereas, lead 31 is the sign of the result of that subtraction process.

OPERATION

The purpose of J-K flip-flop 80 is to provide a logic 1 output when the radicand or word of which the squre root is to be found is a positive value. The present circuit will not operate to provide a correct answer if the radicand is not positive. Assuming that the convention is used that the word is presented least significant bit first and that the most significant or sign bit is a logic 0 to indicate a positive number, then the clock input 72 will be going negative at the end of word time $N_o$ at which time the inverted input at J will represent a logic 1. This will set the J-K flip-flop 80 to have its Q-output at a logic 1 value for the remainder of the frame. In this application a frame is defined as a number of word times equal to the number of bits in a word. In the particular circuit illustrated the words have 8 bits and thus a frame is eight word times in length. FIG. 2 provides an example of the words found at various points within the circuit. In Column $N_o$, line I, it will be determined that I for this word time is the same as the radicand appearing on line 10. The sync bit in line 1 of FIG. 2 is identical with the sign bit or most significant bit in time of occurrence.

The lower portion of FIG. 1 is utilized to generate a actuating bit to be used in filling the J register 88 as well as to assist in generating the root extractor word M. This is accomplished by passing a sign or sync bit through the 1 bit shift register 50 to lead 52. During word time $N_0$ a logic 1 will appear at the output of NAND gate 58 at the time that a logic 1 appears on lead 52. A logic 1 will also appear at the output of NAND gate 58 when the lead 52 is a logic 0 and lead 70 is a logic 1. Thus, it will be ascertained that due to the 7 bits of storage or delay in shift registers 60 and 68, the bit which is inserted in the first bit time period of word $N_0$ by the delayed sync bit occurring in word time $N_7$ will traverse the loop and come back through NAND gates 56 and 58 to appear at the input of shift register 60. This bit occurs one bit time period earlier in each successive word of the frame until word time $N_7$ when it is deleted from word $N_7$ due to the occurrence of the delayed sync bit appearing at lead 52. As will be ascertained, the appearance of a logic 1 on lead 52 will prevent the passage of a logic 1 through NAND gate 56. This is due to the inversion thereof at the input of NAND gate 56 to effectively produce a logic 0. After a 5 bit delay, the signals appearing at the output of NAND gate 58 also appear on lead 62. The AND gate 64 will pass the logic 1's appearing on lead 62 until such time as this bit occurs simultaneously with a sync bit. This first occurs in word time N5. The occurrence of the sync bit on lead 42 at the same time as the logic 1 appears on lead 62 will set flip-flop 66 to have a logic 1 output. This logic 1 output as inverted to AND gate 74 will prevent the passage of the next bit through AND gate 74 as received on lead 62 and through AND gate 64 in word time $N_6$. On the most significant bit time of word $N_6$ the sync bit on lead 42 will flip J-K flip-flop 66 back to its original condition so a logic 0 appears at the output. However, there are no logic 1's appearing on lead 62 during word time $N_7$ and thus there are no more bits indicative of M passed to the NAND gate 76. As previously indicated, the M word appearing on lead 75 is indicative of the root extractor and more specifically in this application is indicative of the root extractor squared. This bit starts out having a value of one-fourth and is decreased by a factor of two on each successive occurrence until word time $N_5$ after which time the value is assumed to be too small to affect the answer. As will be ascertained from FIGS. 1 and 2 during word time $N_o$ the radicand word appearing on lead 10 is inserted into shift register 22. Further, the $N_o$ word appearing on lead 72 and applied to the input of AND gate 86 clears shift register 88 to an all logic 0 condition. During word time $N_1$, the circuitry in the center of FIG. 1 and specifically in the summing circuit 24 compares the value of I with the total value of M and J.

At this time J is zero and thus the arithmetic value one-fourth, which is the effective value of word M, is compared with I through the use of J-K flip-flop 30 to produce an output on lead 31 indicative of the sign. J-K flip-flop 30 operates in a manner similar to that of 80 and checks the most significant or sign bit at the time of occurrence of the sync bit on lead 42 to provide a logic 1 output if the result of the subtraction in summing circuit 24 is a positive number, or in other words, one having a logic 0 for the most significant bit. This lgoic 1 output is indicative of the fact that the radicand is equal to or larger than one-fourth (root extractor squared) and thus the square root of this radicand must be equal to or larger than one-half. Thus, the Q-output from J-K flip-flop 30 combines with the signal on lead 70 and that on lead 82 to insert a logic 1 in the next most significant bit of the J word being applied to shift register 88. As is known this next most significant bit position in the logic 1 condition is equivalent to one-half of the total numerical equivalent of a given binary word. If, however, the result of the subtraction is a negative number, this indicates that the original radicand was less than one-fourth and thus the square root answer would be less than one-half. In this instance there is no logic 1 at the Q output of J-K flip-flop 30 and thus no logic 1 is inserted in the J word. The result of the subtraction process appearing on lead 26 is also stored in shift register 28. If the result illustrates that the radicand is equal to or larger than one-fourth, the positive or logic 1 signal appearing on lead 31 actuates gate 34 and deactivates gate 36 such that the difference word stored in shift register 28 is used in the processing during word time $N_2$. The 1 bit shift register 44 effectively operates to shift each bit position of the word and thereby performs the doubling operation as shown in each of the steps of the frame in FIG. 3. On the other hand, if the difference is negative so that no logic 1 appears on lead 31, the gate 36 is activated and the word which was stored in shift register 22 is doubled in value and compared with the new value of M + J.

These steps are repeated until word time $N_o$ at which time a new radicand is inserted on lead 10 and the word J is inserted into shift register 92 preparatory to supplying the square root of the previous radicand as an output signal during the next frame of operation.

While I have shown a specific embodiment of the invention, I wish to be limited only to a circuit, as defined in the accompanying claims, which uses a serial binary format for the radicand with the least significant bit first and wherein the "remainder" of the square root operations is compared in each word step of a frame with the summation of a root extractor and the accumulated quotient of the square root obtained during the previous word time to determine whether or not an additional logic bit should be inserted in the quotient being accumulated before doubling the remainder and performing the same steps again until the end of a frame at which time the accumulated quotient is equivalent to the square root of the radicand provided at commencement of the square rooting operation.

I claim:

1. Serial binary square root apparatus comprising, in combination:

first means for supplying a radicand word $I_o$ in serial data bit format LSB first and having N bits;

second means for storing J and for initially setting J equal to zero where J represents the accumulated quotient of a square root operation;

third means for generating M where M equals $\frac{1}{2}^{(n+2)}$ and $n$ equals the individual word time in a frame of N words;

fourth means for circulating the radicand word $I_o$ as initially supplied and as modified by the square rooting operations within the apparatus N times during the square rooting operation;

fifth means for subtracting M and J from I for each word of the frame where I is the remainder after each circulation occurring in the square root operation and at commencement of the square root operation equals $I_o$ and said fifth means providing a difference word output;

sixth means for checking the difference word output and providing a sign signal when the difference word is positive; and gating means for inserting a logic 1 into said second means in a bit position corresponding to $n$ when said sixth means produces the sign signal.

2. Apparatus as claimed in claim 1 comprising, in addition:

means for checking the sign of $I_o$ and preventing operation of said gating means if $I_o$ is negative.

3. Apparatus as claimed in claim 1 wherein said fifth means includes:

first and second word storage means; and further gating means for storing and doubling the value of one of the words I-M-J and I in accordance with the presence and absence of said sign signal in preparation for the next word circulation in the square rooting operation.

4. Serial binary square rooting apparatus for obtaining the square root of a serial binary word $I_o$ having N binary bits in an operation having a frame of N words comprising in combination:

apparatus input means for supplying a serial binary word $I_o$;

first, second, and third multiple bit storage means, each including input and output means;

first gating means, including first and second control means, first, second, and third input means and output means;

means connecting said first, second, and third input means respectively of said first gating means to receive signals from said output means of said first and second multiple bit storage means and from said apparatus input means.

means for supplying a control signal to said first control means of said first gating means to connect said third input means thereof to said output means thereof, during the first word of a frame;

word summing means including first and second input means and output means;

means connecting said output means of said first gating means to said input means of said first multiple bit storage means and to said first input means of said word summing means to supply words I thereto;

second gating means, including control means, connected to said output means and said input means of said third multiple bit storage means to allow word circulation, said control means thereof for inserting predetermined logic bits into said third storage means in positions corresponding to the word position in the square rooting operation frame in accordance with received control signal inputs to form an accumulated square root quotient J;

generating means for generating predetermined root extractor logic bits M;

signal combining means connected to said generating means and to said input means of said third multiple bit storage means for receiving signals therefrom and supplying a logical combination thereof to said second input of said summing means;

sign detection means connected to said output means of said summing means for providing an output control signal to said control means of said second gating means and to said second control means of said first gating means, the control signal supplied to said second control means enabling passage of the word from said second multiple bit storage means for the following word time; and means connecting the output means of said summing means to said input means of said second multiple bit storage means.

5. Apparatus as claimed in claim 4 comprising, in addition, further sign detection means connected to said apparatus input means and to said second gating means for enabling passage of logic 1 bits to said third multiple bit storage means only when $I_o$ is a positive number.

6. Apparatus for obtaining a serial word square root from a serial word radicand $I_o$ over a time period of N serial words comprising a word frame comprising, in combination:

means for generating J;

means for generating M;

means for comparing I with M + J for each word of a frame of N words used in obtaining a square root wherein:

I = the remainder after a given word of the frame $= I_o - J^2$

J = the accumulated square root quotient at a given word of the frame

M = a root extractor squared

N = number of bits in a word;

means, connected to said means for comparing and to said means for generating J and M, for generating and thereafter doubling I after each comparison when I is less than M + J and in the alternative for doubling I - M - J after each comparison when I is equal to or greater than M + J and additionally inserting a logic 1 into said means for generating J corresponding in bit position in the J word with total number of comparisons performed in the frame; and means, connected to said means for generating J, for outputting $\sqrt{I_o}$ after the final comparison of the frame.

* * * * *